Feb. 6, 1934.  F. D. BRADDON ET AL  1,946,189
FLAW DETECTOR FOR TUBULAR CONDUCTORS
Filed July 21, 1932  2 Sheets-Sheet 1
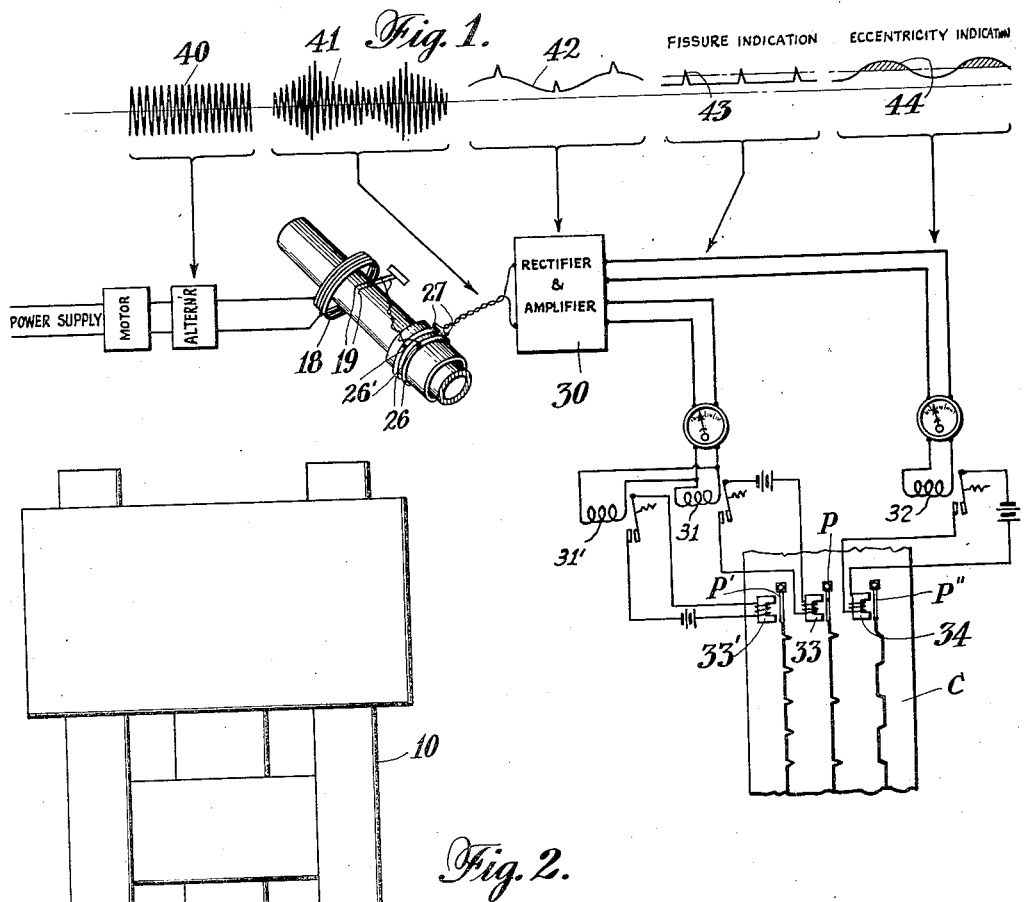
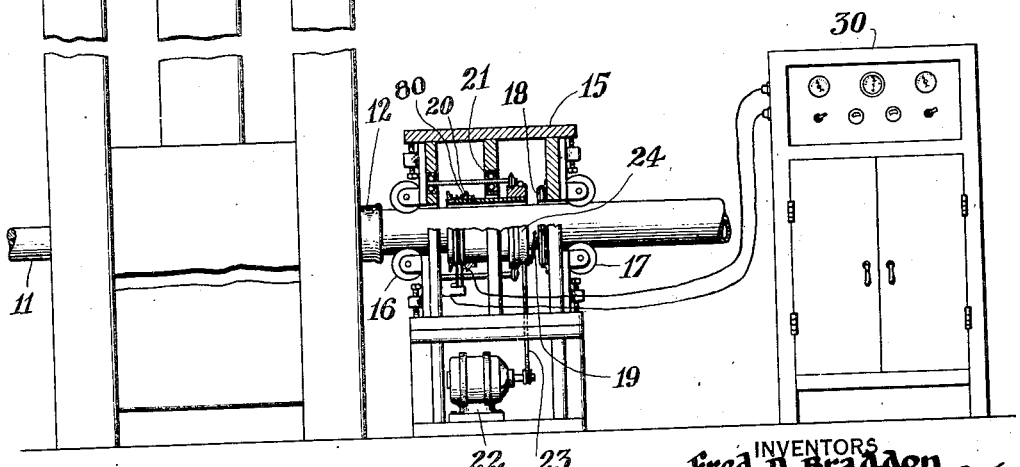
INVENTORS
Fred D. Braddon
Francis H. Shepard, Jr.
BY Joseph H. Lipschutz
ATTORNEY Feb. 6, 1934.   F. D. BRADDON ET AL   1,946,189
FLAW DETECTOR FOR TUBULAR CONDUCTORS
Filed July 21, 1932   2 Sheets-Sheet 2
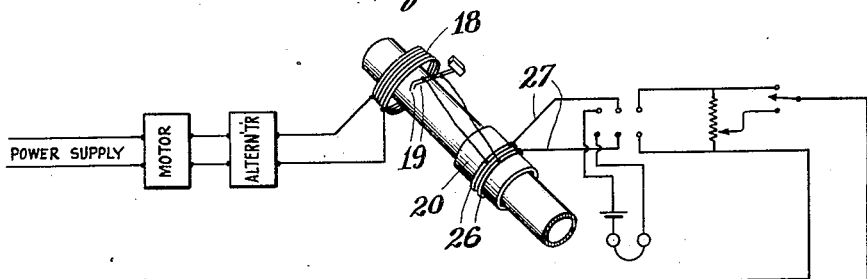
Fig. 3.
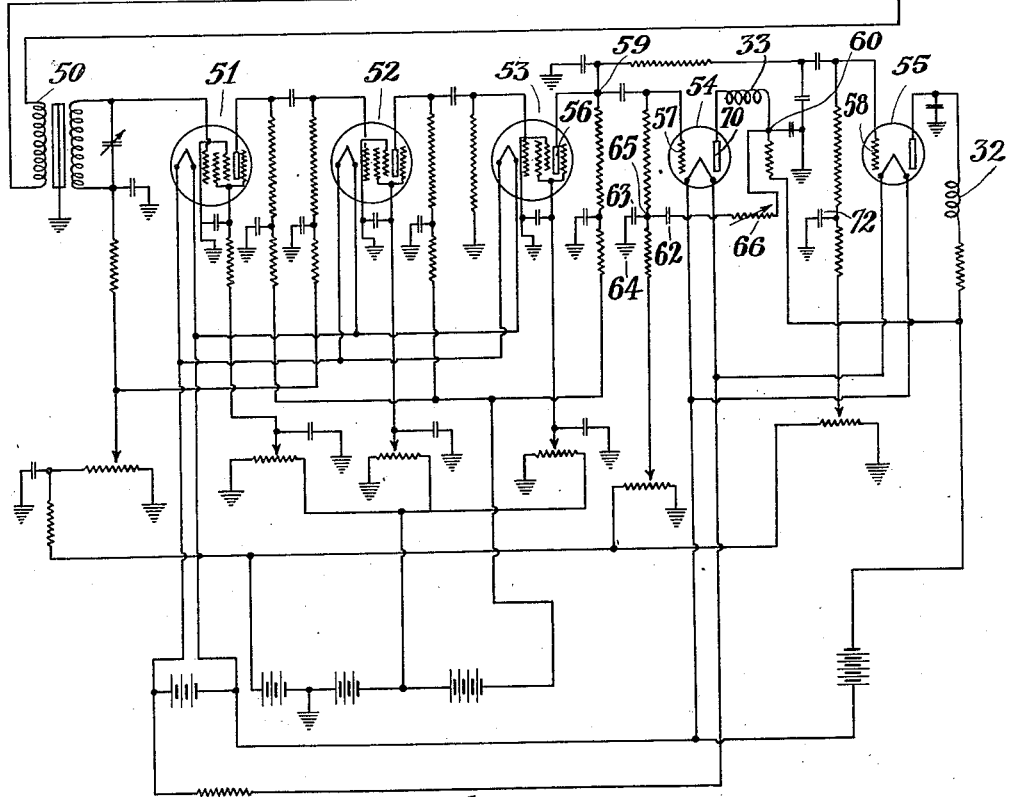
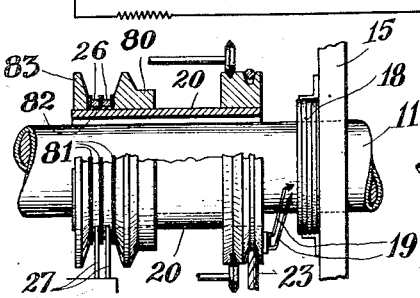
Fig. 4.
INVENTORS
Fred D. Braddon
Francis H. Shepard, Jr.
BY
Joseph N. Lipschutz
ATTORNEY Patented Feb. 6, 1934

1,946,189

UNITED STATES PATENT OFFICE 1,946,189

FLAW DETECTOR FOR TUBULAR CONDUCTORS

Fred D. Braddon, Eltingville, Staten Island, and Francis H. Shepard, Jr., New Rochelle, N. Y., assignors to Sperry Products, Inc., Brooklyn, N. Y., a corporation of New York Application July 21, 1932. Serial No. 623,748

17 Claims. (Cl. 175—183)

This invention relates to a method and means for testing tubular conductors, such as the lead sheathing surrounding electric cables, and is an improvement over the co-pending application of Elmer A. Sperry, Jr. and Francis H. Shepard, Jr., Serial No. 592,524 filed February 12, 1932 for Flaw detector for electrical conductors. As set forth in detail in the said co-pending application, the method employed consists in providing relative rotation as well as relative axial movement between the detector mechanism and the cable so that said mechanism traverses a substantially spiral path whereby the entire circumference of the lead sheath is tested. The detector mechanism may comprise a pair of contacts or inductive means which will detect any variations in the characteristics of current flow through the sheath, the current being supplied to the sheath either by contacts to establish a current therethrough or by an inducing coil to induce a flux.

By the use of the above method it was found that flaws were detected, said flaws consisting not only of fissures within the sheath but also of eccentricities or variations of thickness of the sheath wall. No means were shown, however, in said co-pending application for differentiating between fissures and eccentricities. It is the principal object of this invention to provide in a mechanism of the type described in said co-pending application means whereby separate indications of fissures and eccentricities may be obtained.

Further objects and advantages of this invention will become apparent in the following detailed description thereof.

In the accompanying drawings,

Fig. 1 is a diagrammatic representation of our invention.

Fig. 2 is a front elevation of a lead sheath forming machine with our testing apparatus applied thereto, the said apparatus being shown partly sectioned.

Fig. 3 is a wiring diagram showing the details of the amplifier.

Fig. 4 is an enlarged view of a portion of the device shown in Fig. 2.

Referring to Fig. 2 of the drawings, it will be seen that our invention is designed to be applied to a lead sheath forming machine which is shown at 10 and through which a cable 11 is designed to be passed. As said cable passes through the machine 10 an extrusion device under pressure from a hydraulic pump within machine 10 coats the cable 11 with lead so that the lead sheath covered cable passes out of the machine at 12. At the discharge side of the lead sheath forming machine is positioned the testing apparatus 15 which includes sets of guide rollers 16 and 17 for guiding the cable, the testing apparatus being interposed in the space between said sets of rollers. Said testing mechanism may comprise means for passing current through the sheath or for inducing flux therein. The latter form is here shown and includes an induction coil 18 positioned concentrically with the lead sheath to induce flux therein. The detector mechanism may comprise a pair of contacts 19 operating in the region of the induced flux to take off a voltage therefrom. Any variations in said voltage or flux due to fissures or eccentricity will be picked up by the contacts 19. Spaced contacts may be provided for passing current through the lead sheath in place of the inducing coil 18 and induction coils may be substituted for the contacts 19 as shown in the said co-pending application Serial No. 592,524 and in the Sperry Patent No. 1,820,505. In order that the detector mechanism may test the entire circumference of the sheath, relative rotation as well as relative axial movement is provided. The relative axial movement may be obtained by the continued passage of the lead covered sheath through the testing device 15, while relative rotation between the parts may be obtained by mounting the contacts 19 on a rotating cylinder 20 concentric with the lead sheath, said cylinder being rotated in bearings 21 by any suitable means such as a motor 22, belt 23, and pulley 24.

The detector mechanism now traces a spiral path on the surface of the lead sheath and traverses substantially the entire surface thereof. Any variations in current flow due to fissures or eccentricity of the lead sheath will be picked up by the detector mechanism and after being amplified by the amplifier 30 may be utilized to actuate relays 31, 31' and 32 which in turn may energize suitable indicators such as pens P, P', P'' through means such as magnets 33, 33' and 34 to make records on a chart C.

Heretofore, no means was provided whereby fissures could be distinguished from eccentricities. By this invention suitable means is provided for separating the responses due to fissures from those due to eccentricities, thus enabling them to be separately indicated. Thus, in Fig. 1 it will be seen that there is indicated diagrammatically a constant energizing current 40 supplied to the inducing coil 18. The contacts 19 would pick up a constant voltage if there were no fissures or eccentricities present; but in the presence of fissures and eccentricities the oscillograph made by the output from such contacts is shown at 41. When this output is rectified it appears as shown at 42 and this enables one to see at once that the graph is actually a composite of two separate types of indications. One type is the sharp indication of short duration shown at 43 and is the quick impulse generated when the detector mechanism passes over a fissure, since such fissures are of slight extent. The other indication is that shown at 44 and is of relatively long duration. This latter indication is caused by an eccentricity which results in an impulse of relatively long duration as the detector mechanism passes thereover. The problem has been to separate the composite impulse obtained by the detector mechanism, as shown by the graph at 42, into the components 43 and 44 indicating respectively fissures and eccentricities.

In Fig. 3 we have shown a view similar to Fig. 1 but in which the amplifier diagram is disclosed in detail. Within this amplifier lies the mechanism whereby the fissure indications are separated from the eccentricity indications so that each may actuate its own indicator. The output from the detector mechanism 19 may be taken off slip-rings 26 by means of brushes 27. The potential taken off by brushes 27 forms the input to the amplifier at 50. After passing through rectifying and amplifying stages 51, 52 and 53, the output from said amplifier 53 is split at 59 and led into two tubes 54 and 55, the output from plate 56 of tube 53 being connected to the grids 57 and 58 of tubes 54 and 55, respectively.

Tubes 54 and 55 are caused to respond to short duration impulses and long duration impulses, respectively, by the following means: A feedback is provided from the output of grid 56 to the tube 54 from point 60 through condensers 62 and 63, the latter being connected to a ground 64 and the said feed-back circuit being connected at point 65 to the input grid 57. If a quick impulse passes out of plate 56, substantially no counteracting E. M. F. will be placed upon grid 57 by the feed-back because of the fact that condensers 62 and 63 charge inversely as the frequency and therefore little or no charging of condensers 62 and 63 takes place, so that no E. M. F. is placed on grid 57 in opposition to the E. M. F. placed thereon by the output of plate 56. The quick impulse, therefore, produces an output from the plate 70 of the tube 54 through the relay 31 to energize magnet 33 and actuate pen P. Several relays, 31, 31' may be connected in parallel, said relays being of varying resistance and each relay energizing its own magnet 33, 33' to operate respective pens P, P' and thus give some indication of the intensity of the fissure.

The said short-period impulse does not energize relay 32 because the output from plate 56 must first charge condenser 72 which is connected to ground, and since the extent of such charging is inversely as the frequency, no appreciable charge will be placed on condenser 72 by the short-duration impulse, so that no E. M. F. will be impressed on the input grid 58 and the relay 32 will not be energized.

If, now, a relatively prolonged impulse is put into the amplifier because of the presence of an eccentricity, the output from plate 56 is impressed on grid 57 of tube 54, but the long period of the impulse permits the feed-back from point 60 to charge condenser 63 and through condenser 62 and resistance 66 to place a counteracting or opposing E. M. F. on said grid and thus limit the output from plate 70. The fissure-indicating relay or relays 33, 33' are therefore not actuated. At the same time, the long period impulse permits the output from plate 56 to charge condenser 72 and place an E. M. F. on the input grid 58 of tube 55 and thus energize relay 32 which may energize magnet 34 to actuate an indicator such as pen P''.

By referring to the diagrammatic showing in Fig. 1, there is disclosed a loop formed by a portion of the collector rings 26 between the points of contact of brushes 27 and the fixed connections 26' which rotate with the collector rings, the loop being completed by the wires connecting the said connections and said brushes. This loop varies in size as the collector rings and their connections 26' rotate. Because of this variable loop, variations in flux from the source of supply, and also because of the fact that the collector rings 26 cannot be made perfectly uniform in cross-section throughout the entire rings, flux from the energizing coil 18, upon reaching the said variable loop and said non-uniform rings, induces a periodic current in said loop and rings. This induced current puts an E. M. F. on the amplifier and therefore results in an indication similar to that of an eccentricity because of the said periodic variations.

In order to obviate the false indication thus obtained, we have taken two steps: first, we have placed the collector rings as far removed from the inducing coil 18 as the supporting structure will permit; second, we have interposed between the inducing coil and the collector rings, preferably at a point closely adjacent the collector rings, a shield 80 of material whose characteristics will result in a counteracting effect upon the flux from coil 18 so that the collector rings and the loop formed thereby are substantially unaffected. The material out of which member 80 is made is preferably a large mass of copper to provide minimum resistance to the current induced by the flux which reaches it from coil 18. Said induced current builds up a field substantially equal and opposite to that due to the flux from coil 18. As a consequence, substantially none of the flux from coil 18 reaches the collector rings 26, and therefore none reaches the hereinbefore described loop, since said rings are positioned beyond member 80 and insulated therefrom by insulation 81, 82. Another member 83, also formed of a large mass of material of low resistance such as copper, may be applied to the outer end of the rotating member 20 on the opposite side of the collector rings to perform the same function at the other end. If desired, members 80 and 83 may be formed of one integral mass.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a detector mechanism for tubular hollow conductors such as lead sheaths of cables, comprising means for passing current therethrough, means for detecting variations in the characteristics of current flow, and means selectively responsive to variations due to fissures and to eccentricities.

2. In a detector mechanism for tubular hollow conductors such as lead sheaths of cables, comprising means for passing current therethrough, means for detecting variations in the characteristics of current flow, means selectively responsive to variations due to fissures, a plurality of indicators, and means whereby said indicators are selectively actuated by said responsive means.

3. In a detector mechanism for tubular hollow conductors such as lead sheaths of cables, comprising means for passing current therethrough, means for detecting variations in the characteristics of current flow and means for amplifying said variations, said amplifying means having means selectively responsive to variations of different periods.

4. In a detector mechanism for tubular hollow conductors such as lead sheaths of cables, comprising means for passing current therethrough, means for detecting variations in the characteristics of current flow, means for amplifying said variations, said amplifying means having means selectively responsive to variations of different periods, a plurality of indicators, and means whereby said indicators are selectively actuated by the output of said amplifying means.

5. In a detector mechanism for tubular hollow conductors such as lead sheaths of cables, comprising means for passing current therethrough, means for detecting variations in the characteristics of current flow, and means for amplifying said variations, said amplifying means having a plurality of output circuits, said circuits including means for rendering them selectively responsive to variations of different periods.

6. In a detector mechanism for tubular hollow conductors such as lead sheaths of cables, comprising means for passing current therethrough, means for detecting variations in the characteristics of current flow, and means for amplifying said variations, said amplifying means having a plurality of parallel circuits, said circuits including means for rendering them selectively responsive to variations of different periods.

7. In a detector mechanism for tubular hollow conductors such as lead sheaths of cables, comprising means for passing current therethrough, means for detecting variations in the characteristics of current flow, means for amplifying said variations, said amplifying means having a plurality of output circuits, said circuits including means for rendering them selectively responsive to variations of different periods, a plurality of indicators, and means whereby said indicators are actuated from the respective circuits.

8. In a detector mechanism for tubular hollow conductors such as lead sheaths of cables, comprising means for passing current therethrough, means for detecting variations in the characteristics of current flow, and means for amplifying said variations, said amplifying means having a plurality of parallel circuits, said circuits including means for rendering them selectively responsive to variations of different periods, a plurality of indicators, and means whereby said indicators are actuated from the respective circuits.

9. In a detector mechanism for tubular hollow conductors such as lead sheaths of cables, comprising means for passing current therethrough, means for detecting variations in the characteristics of current flow, and means for amplifying said variations, said amplifying means having a plurality of output circuits, each of said circuits including a thermionic tube having an input and output, one of said circuits including a feed-back from the output to the input of the respective tube whereby only variations of relatively short period will come through the respective tube.

10. In a detector mechanism for tubular hollow conductors such as lead sheaths of cables, comprising means for passing current therethrough, means for detecting variations in the characteristics of current flow, and means for amplifying said variations, said amplifying means having a plurality of output circuits, each of said circuits including a thermionic tube having an input and output, one of said circuits including a feed-back from the output to the input of the respective tube, said feed-back including a grounded condenser whereby only variations of relatively short period will come through the respective tube.

11. In a detector mechanism for tubular hollow conductors such as lead sheaths of cables, comprising means for passing current therethrough, means for detecting variations in the characteristics of current flow, and means for amplifying said variations, said amplifying means having a plurality of output circuits, each of said circuits including a thermionic tube having an input and output, the input to one of said tubes including a grounded condenser whereby only variations of relatively long period will come through the respective tube.

12. In a detector mechanism for tubular hollow conductors such as lead sheaths of cables, comprising means for passing current therethrough, means for detecting variations in the characteristics of current flow, and means for amplifying said variations, said amplifying means having a plurality of output circuits, each of said circuits including a thermionic tube having an input and output, one of said circuits including a feed-back from the output to the input of the respective tube, said feed-back including a grounded condenser whereby only variations of relatively short period will come through the respective tube, the input to the other of said tubes including a grounded condenser whereby only variations of relatively long period will come through the respective tube.

13. In a detector mechanism for electrical conductors, an inducing coil and a source of energy therefor for inducing current in said conductor, means for detecting variations in the characteristics of current flow, means for relatively rotating said conductor and said detecting means, a plurality of slip-rings electrically connected to said detecting means, and brushes engaging said rings, said rings being positioned beyond the range of effective influence of said coil.

14. In a detector mechanism for electrical conductors, an inducing coil and a source of energy therefor for inducing current in said conductor, means for detecting variations in the characteristics of current flow, means for relatively rotating said conductor and said detecting means, a plurality of slip-rings electrically connected to said detecting means, brushes engaging said rings, and a support for the preceding mechanism, said coil and said rings being positioned at opposite ends of said support.

15. In a detector mechanism for electrical conductors, an inducing coil and a source of energy therefor for inducing current in said conductor, means for detecting variations in the characteristics of current flow, means for relatively rotating said conductor and said detecting means, a plurality of slip-rings electrically connected to said detecting means, brushes engaging said rings, and a shield of low electrical resistance interposed between said coil and said rings.

16. In a detector mechanism for electrical conductors, an inducing coil and a source of energy therefor for inducing current in said conductor, means for detecting variations in the characteristics of current flow, means for relatively rotating said conductor and said detecting means, a plurality of slip-rings electrically connected to said detecting means, brushes engaging said rings, and shielding means of low electrical resistance interposed between said rings and the flux from said coil.

17. In a detector mechanism for electrical conductors, an inducing coil and a source of energy therefor for inducing current in said conductor, means for detecting variations in the characteristics of current flow, means for relatively rotating said conductor and said detecting means, a plurality of slip-rings electrically connected to said detecting means, brushes engaging said rings, a support for the preceding mechanism, said coil and said rings being positioned at opposite ends of said support, and shielding means of low electrical resistance interposed between said rings and the flux from the said coil.

FRED D. BRADDON.
FRANCIS H. SHEPARD, Jr.